Jan. 9, 1951     M. G. TOWNSLEY ET AL     2,537,288
RETARDED ACTION ELECTRIC MOTOR CONTROL DEVICE
Filed June 29, 1946     3 Sheets-Sheet 1

INVENTORS
MALCOLM G. TOWNSLEY
WILLIAM MACK
BY Robert F. Miehle
ATT'Y.

Jan. 9, 1951 M. G. TOWNSLEY ET AL 2,537,288
RETARDED ACTION ELECTRIC MOTOR CONTROL DEVICE
Filed June 29, 1946 3 Sheets-Sheet 2
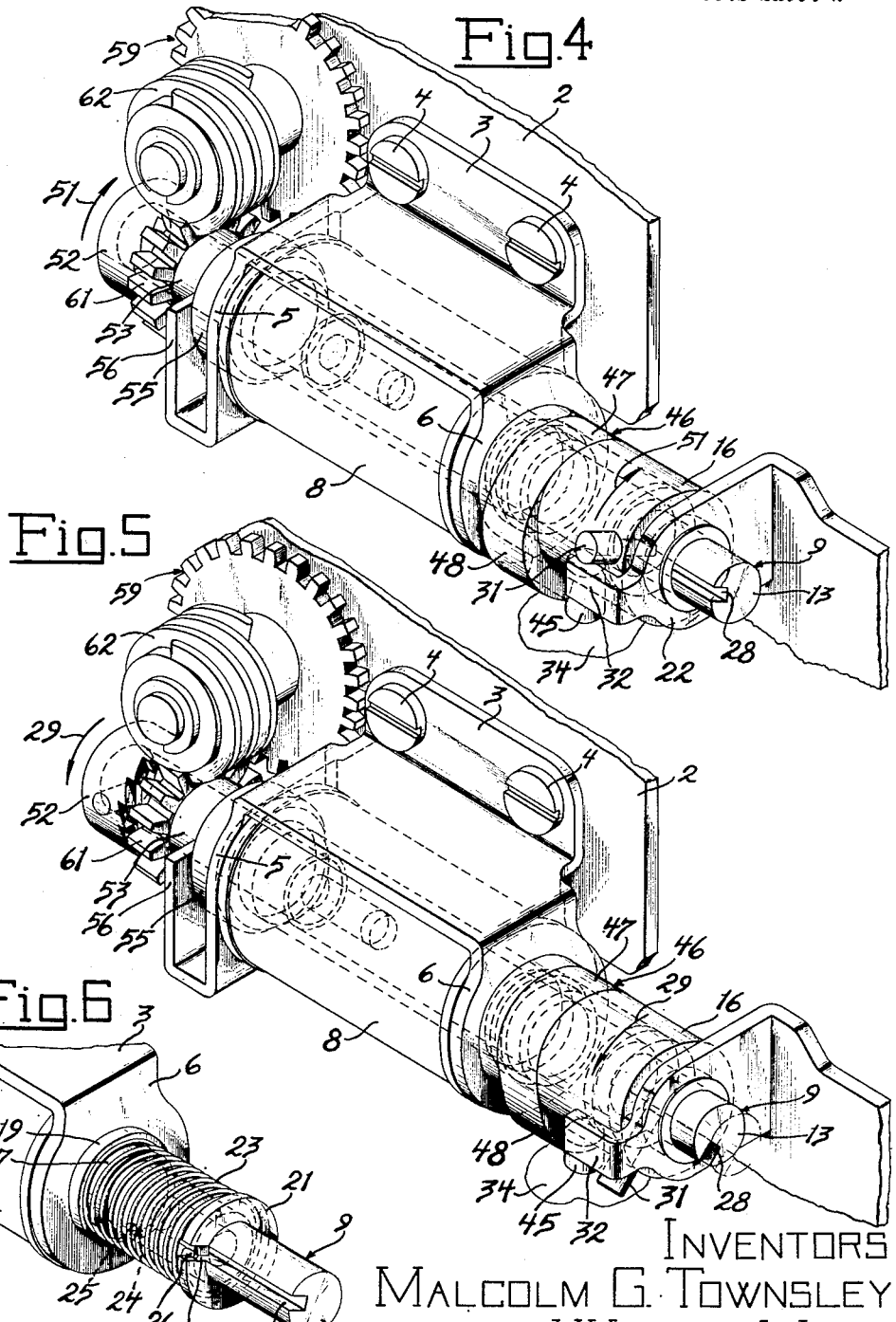
INVENTORS
MALCOLM G. TOWNSLEY
WILLIAM MACK
BY Robert F. Miehle, Jr.
ATTY.

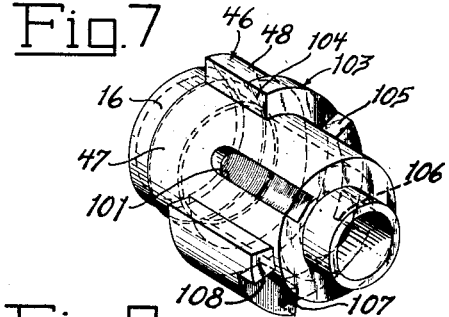
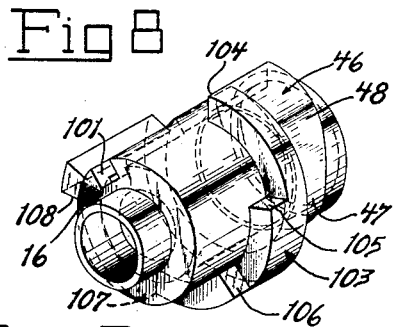
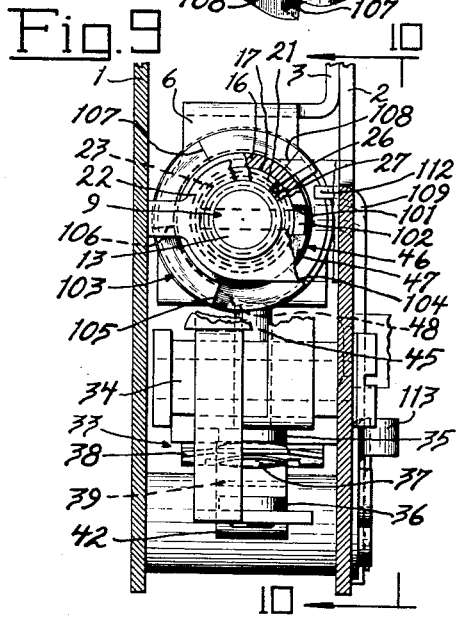
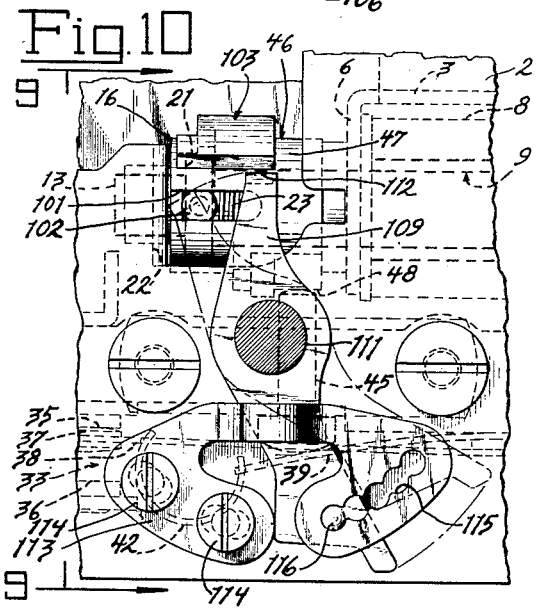
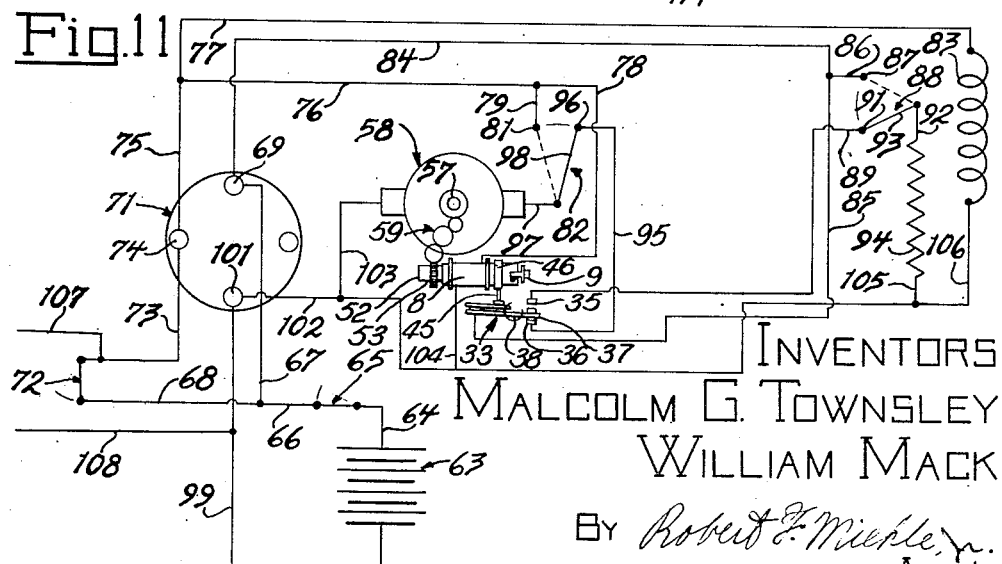

Patented Jan. 9, 1951

2,537,288

UNITED STATES PATENT OFFICE 2,537,288

RETARDED ACTION ELECTRIC MOTOR CONTROL DEVICE

Malcolm G. Townsley and William Mack, Park Ridge, Ill., assignors to Bell & Howell Company, Chicago, Ill., a corporation of Illinois Application June 29, 1946, Serial No. 680,356

12 Claims. (Cl. 318—466)

1

Our invention relates to a retarded action electric motor control device which is particularly adapted for use in jointly controlling an electric motor driven motion picture camera and a gun for photographically recording the firing of the gun with reference to a target or objective on which the gun is trained, the retarded action motor control device effecting operation of the camera for an interval after a common manual photographing and firing control has been actuated to non-photographing non-firing position, so that the trajectory of a projectile fired by the gun, taking place after the manual photographing and firing control has been actuated to non-photographing non-firing position, is photographically recorded by the camera.

Objects of the invention reside in the provision of a novel, effective and reliable retarded action electric motor control device, which is particularly adapted for the use stated above, which provides for timing of the delayed action without employing escapement means therefor, which provides for convenient adjustment of the interval of the delayed action, which provides for alternate energization of two controlled circuits as for alternately energizing a camera motor and a camera heater, which is capable of compactness and well adapted to be built into an electric motor driven motion picture camera as a unit thereof, and which provides for conveniently rendering the device inoperative or operative to control the motor.

The invention will be better understood by reference to the accompanying drawing forming a part hereof and in which—

Figures 4 and 5 are similar perspective views showing parts in different positions;

Figure 6 is a partial perspective view similar to Figures 4 and 5 with parts removed;

Figures 7 and 8 are different perspective views of the electric switch controlling cam, hereinafter described, of the embodiment of my invention illustrated in Figures 9 and 10;

Figure 9 is an end sectional view of another embodiment of my invention and taken substantially on the line 9—9 of Figure 10;

2

Figure 10 is a partial side elevation of the embodiment of and taken on the line 10—10 of Figure 9; and Figure 11 is a wiring diagram of the device.

Figure 1:
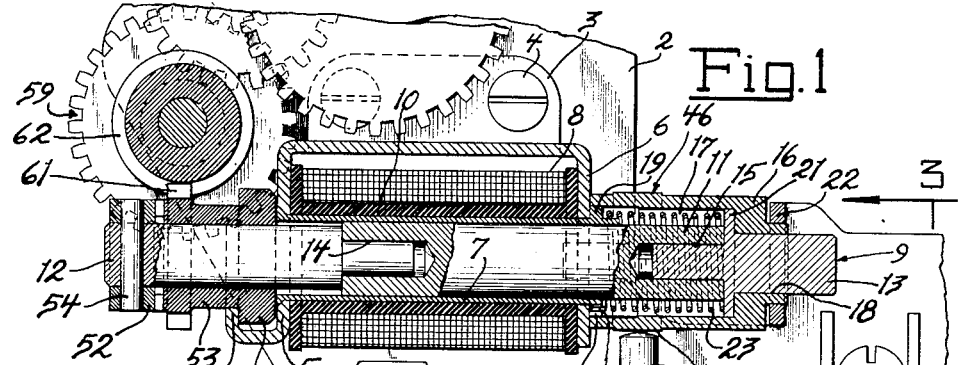
Figure 1 is a partially sectional side elevational view of a retarded action electric motor control device embodying our invention and taken substantially on the line 1—1 of Figure 3.

Referring to Figures 1 to 6, 1 and 2 respectively designate parallel vertical frame plates of the mechanism frame of a motion picture camera, and a bracket 3 is disposed between these frame plates and is secured on the frame plate 2 as designated at 4. This bracket is provided with horizontally spaced parallel bracket portions 5 and 6 disposed normal to the frame plates 1 and 2, and a horizontal sleeve 7 of non-magnetic metal extends across between and through the bracket portions 5 and 6 and is secured therewith as shown in Figure 1. A solenoid 8, carried on a bored spool 10 of insulating material, is fixed between the bracket portions 5 and 6 and surrounds the sleeve 7.

A shaft, generally designated at 9, extends through the sleeve 7 and is mounted therein for rotation and axial shifting movement. As shown, the shaft extends outwardly from both ends of this sleeve and the solenoid 8, the solenoid thus surrounding the intermediate portion of the shaft. Also as shown, this shaft consists of three axial portions, i. e., a middle portion 11 and opposite end portions 12 and 13 secured with the middle portion as respectively designated at 14 and 15. The end shaft portion 12, which is at the left in Figure 1, is of non-magnetic material, while the middle shaft portion 11 or the middle shaft portion and the end shaft portion 13 is or are of magnetic material, say Norway iron, so that a portion of the shaft forms an armature for the solenoid for axially actuating the shaft, i. e., to the left in Figure 1, upon energization of the solenoid.

An axially bored cam member 16, have large and small bore portions respectively designated at 17 and 18, is disposed coaxially of the shaft 9 in the region of the shaft end portion 13 and the shaft projects through the bore of the cam member. The cam member is rotatably mounted by means of the outer end portion of the large bore portion 17 rotatably engaging on a flange 19 of the sleeve 7, of the small bore portion 18 rotatably engaging on the shaft end portion 13 immediately outward of a flange 21 on this shaft end portion, and of a bored portion 22 of the frame plate 2 in which the reduced outer end of the cam member is rotatably engaged, the cam member being axially confined between the bracket portion 6 and the bearing portion 22 and the shaft 9 being axially shiftable relative to the cam member.

A helical spring 23 is disposed within the enlarged bore portion 17 of the cam member 16 between the flanges 19 and 21 and surrounds the shaft 9, and this spring has one end 24 bent axially and engaged in a radial slot 25 of the flange 19 of the sleeve 7 to angularly fix this end of the spring with this sleeve, see Figures 1 and 6, and has its other end 26 bent axially and engaged in a radial slot 27 of the flange 21 to angularly fix this end of the spring with the shaft 9 as shown in Figure 6, the slot 27 forming a continuation of a keyway 28 in the shaft end portion 13.

The spring 23 is torsionally operative between the sleeve 7 and the shaft 9 to yieldably rotate this shaft in the counter-clockwise direction in Figures 3 to 6 inclusive and as indicated by the arrows 29 in Figure 5, and is compressionally operative between the flanges 19 and 21 to axially actuate the shaft 9 in the direction, i. e., to the right in Figure 1, opposite that in which this shaft is actuated by the solenoid 8 upon energization of the solenoid. A stud 31 extends radially through the wall of the cam member 16 adjacent the outer end thereof and being secured with the cam member, is slidably engaged in the keyway 28 of the shaft 9 to provide a drive connection operative to angularly fix the cam member and shaft and to permit axial movement of the shaft relative to the cam member, see Figures 3 and 4, the spring 23, by reason of the cam member being angularly fixed with the shaft, being also torsionally operative on the cam member to yieldably rotate it in the direction of the arrows 29 in Figure 5. The stud 31 extends radially outward from the cam member to form a stop which cooperates with a stop lug 32 on the bearing portion 22 to limit angular movement of the cam member in the direction in which the shaft 9 and with it the cam member is urged by the spring 23. The stud 31 and stop lug 32 may also limit angular movement of the cam member and shaft in the opposite direction, but this is not essential for the functioning of the device.

A double throw single pole snap action electric switch, generally designated at 33, is mounted on the frame plate 2 below the cam member 16, see Figures 1 and 2, and comprises as follows: A base block 34 of insulating material is secured on the frame plate 2, and two vertically spaced opposing stationary contacts 35 and 36 are mounted on the base block. A movable contact 37 is disposed between the contacts 35 and 36 and is mounted on the free end of a horizontal resilient metal blade 38 which has its other end secured on the base block, the movable contact being movable vertically by reason of the resilience of the blade 38 and being thus alternately engageable with the contacts 35 and 36 to alternately close two circuits respectively including the blade 38 and contacts 35 and 37 and the blade 38 and contacts 36 and 37.

A horizontal spring blade 39 has one end thereof secured with the base block 34, and extends in correspondence with the blade 38, corresponding ends of the blades 38 and 39 being secured on the base block as generally designated at 41. A C spring 42 has its ends respectively engaged with free portions of the blades 38 and 39 at points spaced longitudinally of these blades, as respectively designated at 43 and 44, and is compressed between these blades. The free end of the blade 39 is movable to positions above and below the blade 38 as respectively shown in Figures 1 and 2. In these positions of the blade 39, the spring 42 assumes opposite over center relation with the blades 38 and 39 so that, when the blade 39 is in its upper position as shown in Figure 1, the spring 42 positions the blade 38 in its lower position with the contacts 36 and 37 contacting, and when the blade 39 is in its lower position as shown in Figure 2, the spring 42 positions the blade 38 in its upper position with the contacts 35 and 37 contacting. The blade 39 is relatively strong and is biased to assume its upper position and to thus normally maintain the contacts 36 and 37 contacting. The spring 42 in its cooperation with the blades 38 and 39 constitutes the snap action of the switch which results in contact between the contact 37 and the contacts 35 and 36 being made and broken with desirable quickness.

Figure 2:
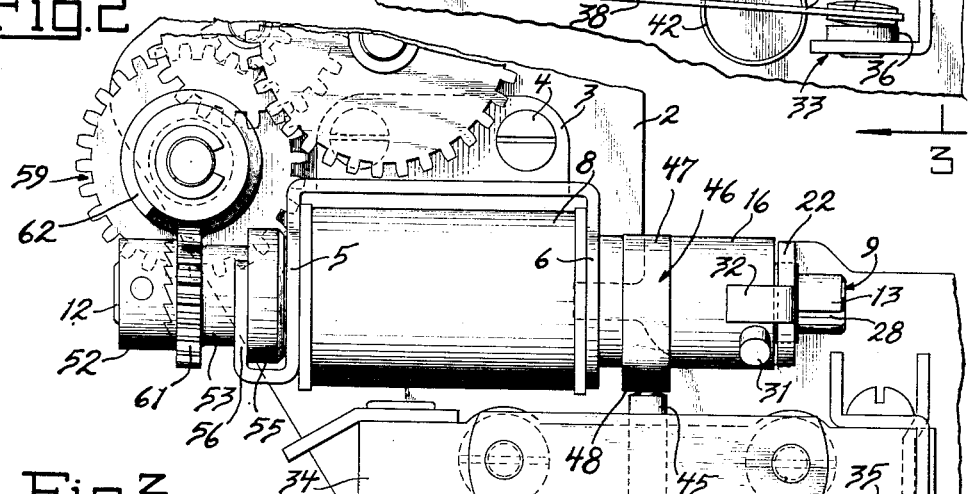
Figure 2 is a side elevational view of the same in elevation similar to that of Figure 1 and showing parts in different positions than those in which they are shown in Figure 1.
Figure 3:
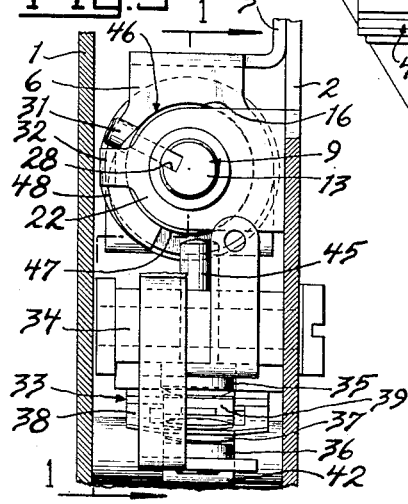
Figure 3 is an end sectional view taken substantially on the line 3—3 of Figure 1.

A vertical stud 45 is mounted on the base block 34 for vertical movement and bears downwardly on the intermediate portion of the blade 39, so that downward movement of this stud effects downward movement of this blade to cause the contact 37 to move upwardly out of contact with the contact 36 and into contact with the contact 35 as shown in Figure 2. The cam member 16 is provided with a radial cam 46 engageable with the upper end of the stud 45 to move it downwardly. This cam is provided with a relatively long dwell portion 47 and a relatively short lift portion 48, as best shown in Figure 3. When the dwell portion 47 of the cam opposes the stud 45, the stud is in its upper position and the contacts 36 and 37 are in contact as shown in Figures 1 and 3, and when the lift portion 48 of the cam depresses the stud 45, the contacts 35 and 37 are in contact as shown in Figure 2. Accordingly, angular positioning of the cam member 16 controls the alternate contacting of the contact 37 with the contacts 35 and 36.

The relatively long dwell portion 47 of the cam effects contacting of the contacts 36 and 37 throughout a substantial portion of the movement of the cam including the end of its movement into which it is urged by the spring 23 and at which it is stopped by the stud 31 engaging the stop lug 32 as shown in Figures 1, 3 and 4, and the lift portion 48 of the cam effects contacting of the contacts 35 and 37 when the cam is at the opposite end of its movement as shown in Figures 2 and 5, and lift portion 48 of the cam being operative to depress the stud 45 as the cam is rotated clockwise against the influence of the spring 23, as indicated by the arrows 51 in Figure 4. Accordingly, the double throw switch including the stationary contacts 35 and 36 and the movable contact 37 is controlled by the cam 46 to alternately close two circuits respectively including the blade 38 and the contacts 35 and 37 and the blade 38 and the contacts 36 and 37 with positioning of the cam at the opposite ends of its movement.

A disengageable toothed clutch comprises axially engageable toothed axially bored clutch members 52 and 53 disposed coaxially of the shaft 9 in the region of the end shaft portion 12 which is opposite the end shaft portion 13 which projects the bore of the cam member 16, the solenoid 8 being desirably disposed between the cam member and clutch and surrounding the intermediate portion of the shaft. Both of these clutch members have their bores engaged on the end shaft portion 12, and the clutch member 52 is secured at the outer end of the shaft portion 12 by means of a pin 54 extending diametrically through this clutch member and shaft portion, whereas the clutch member 53 is rotatably and slidably mounted on this shaft portion between the clutch member 52 and the bracket portion 5. The clutch member 53 is axially fixed by means of a circumferential flange 55 on this clutch member being confined between the bracket portion 5 and an extension 56 of this bracket portion which is doubled back on the bracket portion and engages the side of this flange opposite that which is engaged by the bracket portion. Accordingly, axial shifting movement of the shaft 9 engages and disengages the clutch members 52 and 53, shifting of the shaft to the right in Figures 1, 2, 4 and 5, under the influence of the spring 23 effecting engagement of the clutch members and shifting of the shaft to the left under the influence of the solenoid 8 when energized effecting disengagement of the clutch members as shown in Figure 5.

In addition to the end shaft portion 12 being of non-magnetic material, the clutch member 52 and the pin 54 are of non-magnetic material so they do not interfere with the actuation of the shaft 9 by energization of the solenoid 8. The spring 23 is also of non-magnetic material so that it is not distorted and its functioning interfered with when this solenoid is energized, and the cam member 46 is also of non-magnetic material so that this solenoid when energized does not interfere with rotation of the cam member by the spring.

The clutch member 53 is driven from the shaft 57 of an electric motor 58, which is shown diagrammatically in Figure 11 and which is controlled by the device, through the medium of a reduction gear train generally designated at 59, see Figures 1, 2, 4 and 5, and which includes a spiral gear 61 formed on this clutch member and a worm gear 62 meshing therewith, the motor being utilized say for driving a motion picture camera. The motor drives the clutch member 53 in the direction opposite that in which the shaft 9 is urged by the spring 23, i. e., in the direction of the arrows 51 in Figure 4, so that when the motor is energized and the clutch members are engaged by the spring 23 as shown in Figures 1, 2 and 4, the shaft and cam member 16 are rotated in the direction to cause depression of the stud 45 by the cam 46 and consequent contact of the contacts 35 and 37 as shown in Figures 2 and 5, subsequent disengagement of the clutch members by energization of the solenoid 8 causing the spring 23 to oppositely rotate the shaft and cam member, i. e., in the direction of the arrows 29 in Figure 5, to cause elevation of the stud and consequent contact of the contacts 36 and 37 as shown in Figures 1, 3 and 4.

Referring to Figure 11, an electric current source 63, such as an accumulator battery, has a conductor 64 connecting one pole thereof with one terminal of a current supply switch 65, and a conductor 66 is connected with the other terminal of this switch and divides into branch conductors 67 and 68 of which the conductor 67 is connected to one terminal 69 of a conventional multi-terminal connector 71, and of which the conductor 68 is connected with one terminal of a primary control switch 72. A conductor 73 is connected with the other terminal of the switch 72 and with a second terminal 74 of the connector 71, and a conductor 75 is connected with the terminal 74 and divides into branch conductors 76 and 77 of which the conductor 76 is connected by branch conductors 78 and 79 with one terminal of the solenoid 8 and with one stationary contact 81 of a manually actuated single pole double throw switch 82, and of which the conductor 77 is connected with one terminal of a second solenoid 83.

A conductor 84 is connected with the terminal 69 of the connector 71 and divides into branch conductors 85 and 86 of which the conductor 85 is connected with the blade 38 carrying the movable contact 37 of the switch 33 hereinabove described, and of which the conductor 86 is connected with one stationary contact 87 of a manually actuated single pole double throw switch 88. A conductor 89 connects the other stationary contact 91 of the switch 88 with the stationary contact 35 of the switch 33, and a conductor 92 connects the movable contact member 93 of the switch 88 with one terminal of an electric heater 94, such as is associated with a motion picture camera driven by the motor 58 for heating the camera to insure proper operation of the camera at low temperatures. A conductor 95 connects the stationary contact 36 of the switch 33 with the second stationary contact 96 of the switch 82, and a conductor 97 connects the movable contact member 98 of the switch 82 with one terminal of the motor 58. A conductor 99 connects the other pole of the current source 63 with a third terminal 101 of the connector 71, and a conductor 102 is connected with the terminal 101 and divides into branch conductors 103, 104, 105 and 106 which are connected respectively with the other terminals of the motor 58, the solenoid 8, the heater 94 and the solenoid 83. Conductors 107 and 108 are respectively connected with the conductors 73 and 99 so that the primary control switch 72 controls the energization of another circuit, not shown further, of which this switch and the conductors 107 and 108 form a part, this switch being thus operative to control, jointly with the control by this switch of the motor 58, the heater 94 and the solenoid 83 as hereinafter explained, the operation of an additional instrumentality such as a gun of the automatic type.

Assuming the current supply switch 65 to be in closed position, the primary control switch 72, being included in the circuits of the solenoids 8 and 83 and the circuit of which the conductors 107 and 108 form a part, is operative to simultaneously energize and deenergize these circuits, and assuming the movable contact 98 of the switch 82 to be in contact with the stationary contact 96 and the movable contact 93 of the switch 88 to be in contact with the stationary contact 91, the stationary contact 36 and the movable contact 37 of the switch 33 are in series with the motor 58, and the stationary contact 35 and the movable contact 37 of the switch 33 are in series with the heater 94, so that the switch 33 alternately energizes the motor and heater in opposite positions of the movable contact 37. Assuming the switches 65, 82 and 88 to be in the positions just described, the operation of the device is as follows:

The condition of the device upon the completion of a cycle thereof resulting from closing and opening the primary control switch 72 preparatory to a succeeding cycle resulting from again closing and opening this switch is illustrated in Figure 2. This condition comprises the cam 46, angularly fixed with the shaft 9 and clutch member 52 as hereinabove described, being angularly positioned at the end of its movement opposite that into which it is urged by the spring 23 and at which it is stopped by the stud 31 engaging the stop lug 32, the lift portion 48 of the cam 46 in this opposite end position of the cam member depressing the stud 45 and thus positioning the movable contact 37 of the switch 33 in contact with the stationary contact 35 and out of contact with the stationary contact 36, and the cam member being held in this position by reason of the clutch members 52 and 53 being held in engagement by the spring 23 and the clutch member 53 being held against rotation as by the spiral gear 61 meshing with the worm gear 62, it being observed that the solenoid 8 is now deenergized by reason of the primary control switch 72 being open, that the motor is now not energized by reason of the movable contact 37 of the switch 33 being out of contact with the stationary contact 36, and that the heater 94 is now energized by reason of the movable contact 37 of the switch 33 being in contact with the stationary contact 35.

Closure of the primary control switch 72 energizes the solenoid 8 resulting in axial movement of the shaft 9 against the influence of the spring 23 and consequent disengagement of the clutch members 52 and 53 as shown in Figure 5. The disengagement of these clutch members permits the spring 23 to actuate the cam 46 from the said opposite end position thereof, in which position the cam is shown in Figures 2 and 5, and in the direction of the arrows 29 in Figure 5 and to the end of its movement into which it is urged by this spring and stopped by the stud 31 engaging the stop lug 32 as shown in Figures 3 and 4. In this latter position of the cam 46, the dwell portion 47 of the cam opposes the stud 45 and permits it to assume its upper position with the result that the movable contact 37 of the switch 33 is positioned in contact with the stationary contact 36 and out of contact with the stationary contact 35 as shown in Figures 1, 3 and 11, it being observed that the solenoid 8 is now energized by reason of the primary control switch 72 being closed, that the motor 58 is now energized by reason of the movable contact 37 of the switch 33 being in contact with the stationary contact 36, and that the heater 94 is now deenergized by reason of the movable contact 37 of the switch 33 being out of contact with the stationary contact 35.

This latter condition continues as long as the primary control switch 72 remains closed and may be termed the normal running condition the interval of which is variable at will, a motion picture camera driven by the motor 58 continuing to run and an additional instrumentality, such as a gun of the automatic type, controlled by the switch 72, by reason of this switch being in series with the conductors 107 and 108, also continuing to operate as long as the switch 72 remains closed, it being observed that the clutch members 52 and 53 are disengaged as long as the switch 72 remains closed so that the clutch member 53, which is driven from the motor, rotates free of the shaft 9.

Opening of the primary control switch 72 terminates the operation of the aforesaid additional instrumentality or gun controlled by this switch and also causes deenergization of the solenoid 8 and consequent engagement of the clutch members 52 and 53 by axial actuation of the shaft 9 and clutch member 52 by the spring 23, thus terminating the normal running condition and initiating what may be termed the overrunning condition throughout which the motor 58 continues to run though the switch 72 is open, the condition of the device at the initiation of the overrunning condition being shown in Figures 1 and 4.

At the initiation of the overrunning condition, the cam 46 is positioned at the end of its movement into which it is yieldably urged by the spring 23 and at which it is stopped by engagement of the stud 31 with the stop lug 32, and in this position of the cam member the dwell portion 47 of the cam 46 opposes the stud 45 so that the contacts 37 and 36 of the switch are in contact, which results in the motor 58 continuing to be energized after the clutch members 52 and 53 are engaged.

As the motor continues to be energized, it rotates the shaft 9 and cam 46 through the gear train 59 and the engaged clutch members 52 and 53 in the direction of the arrows 51 in Figure 4 from the end of the movement of the cam member into which it is urged by the spring 23 and at which it is stopped by the stud 31 engaging the stop lug 32 to the opposite end of its movement.

Recalling that the dwell portion 47 of the cam 46 effects contacting of the contacts 36 and 37 of the switch 33 and consequent energization of the motor 58 throughout a substantial portion of the movement of the cam including the end of its movement into which it is urged by the spring 23 and at which it is stopped by the stud 31 engaging the stop lug 32, the motor continues to be energized throughout a commensurate overrun interval while the motor is rotating the cam 46 toward the end of its movement opposite that into which it is yieldably urged by the spring 23 and at which it is stopped by the stud 31 engaging the stop lug 32. When the cam 46, while still being rotated by the motor, approaches the said opposite end of its movement, the lift portion 48 of the cam depresses the stud 45 until the contact 37 of the switch 33 is actuated out of contact with the stationary contact 36 and into contact with the stationary contact 35, whereupon the overrunning condition ceases, the motor being deenergized and the heater being energized, it being noted that the solenoid 8 had been previously deenergized upon the opening of the switch 72 at the initiation of the overrunning condition. This completes the cycle of the device which is then in the condition illustrated in Figure 2 and hereinbefore described.

Referring to Figure 11, the overrun operation of the device may be omitted by placing the movable contact 98 of the switch 82 out of contact with the stationary contact 96 and into contact with the stationary contact 84, which places the primary control switch 72 in series with the motor 58 so that the motor is directly controlled by the latter switch, it being observed that under this condition the solenoid 8 is still in series with the switch 72 so that the clutch members 52 and 53 are disengaged while the motor is energized.

Energization of the heater 94 may be made independent of the switch 33 and subject only to control by the current supply switch 65 by placing the movable contact 93 of the switch 88 out of contact with the stationary contact 91 and in contact with the stationary contact 87, and may be discontinued by placing the movable contact 93 of the switch 88 in an intermediate position out of contact with both of the stationary contacts 87 and 91.

The solenoid 83 is intended for an overrun indicating device, unnecessary to be described, and being in series with the primary control switch 72, is alternately energized and deenergized with closing and opening of this switch for the said purpose.

Figures 7 to 10 inclusive illustrate another embodiment of our invention which differs from that of Figures 1 to 6 inclusive in that, whereas in the embodiment of Figures 1 to 6 the stop means, consisting of the stud 31 and stop lug 32, which stop the cam member 16 and its cam 46 at the end of their movement into which they are yieldably urged by the spring 23, is not adjustable so that the overrun interval is fixed disregarding different speeds of the motor 58, in the embodiment of Figures 7 to 10 inclusive an equivalent stop means is provided which is adjustable to vary the position of the cam member 16 and its cam 46 when stopped thereby, so that the overrun interval may be varied at will, some slight structural changes being also involved in the latter embodiment and the wiring diagram of Figure 11 being applicable to both embodiments. Inasmuch as many of the parts of the embodiment of Figures 7 to 10 inclusive are identical with the equivalent parts of the embodiment of Figures 1 to 6, the same reference characters are applied thereto.

Referring to Figures 7 to 10 inclusive, the cam member 16 is coaxial with and surrounds the shaft 9 in the region of the end portion 13 of the shaft and the spring 23, disposed within the enlarged bore portion 17 of the cam member 16 and having its outer end 26 bent axially and engaged in the radial slot 27 of the flange 21 of the end shaft portion 13, is torsionally operative to actuate the shaft 9 in the counterclockwise direction in Figure 9, which direction is opposite that in which the shaft is rotated from the motor 58 through the clutch members 52 and 53, and the spring is compressionally operative on the flange 21 to axially actuate the shaft 9 to the left in Figure 10 to engage the clutch members 52 and 53 which direction is opposite that in which the shaft is actuated by the solenoid 8 when energized to disengage the clutch members, all the same as is the case with the embodiment of Figures 1 to 6.

The driving connection between the shaft 9 and the cam member 6 is different in that it comprises an axial slot 101 through the wall of the cam member 16 and a stud 102 extending radially into the flange 21 of the end shaft portion 13 and secured therein and slidably engaging the slot 101 to angularly fix the shaft and cam member and to permit axial movement of the shaft relative to the cam member, the spring 23 being also torsionally operative on the cam member, by reason of the stud 102 engaging the slot 101, to yieldably rotate the cam member counterclockwise in Figure 9, and the cam member being provided as before with the cam 46 which is provided with the relatively long dwell portion 47 and the relatively short lift portion 48.

The cam member 16 is provided with a stop formation, generally designated at 103, which consists of a plurality of stop elements stepped angularly and axially of the movement of the cam member as respectively designated at 104, 105, 106, 107 and 108, and a stop lever 109, intermediately pivoted as designated at 111 on an axis disposed transversely to that of the cam member, has at its upper end a stop lug 112 which is adjustable axially of the cam member 16 with pivotal adjustment of the lever to be selectively engaged by the stop elements 104 to 108 inclusive for varying the position of the cam member 16 and its cam 46 at which it is stopped by the stop means comprising the stop elements 104 to 108 inclusive and the stop lever 109. A spring latch member 113 has one end portion secured on the frame plate 2 as designated at 114, and the other portion of this latch member overlies the lower end portion of the lever 109 and is provided with an arcuate notched slot 115 having its axis coincident with the pivotal axis of the lever. A part spherical cam latch element 116 is formed on the lower portion of the lever 109 and has selective camming engagement with the notches of the slot 115 to releasably maintain the lever 109 in its several adjusted position for positioning the stop lug 112 for selective engagement thereof by the stop elements 104 to 108 inclusive.

The stop means, comprising the stop elements 104 to 108 inclusive and the stop lever 109, functions in the same manner as does the stop means comprising the stud 31 and stop lug 32 of Figures 1 to 6 inclusive and so limits movement of the cam 46 in the direction in which it is urged by the spring 23, but is adjustable to vary the position of the cam 46 when stopped thereby.

The cam 46 of Figures 7 to 10 inclusive controls the switch 33 in the same manner as it does in Figures 1 to 6 inclusive, hereinabove described. Recalling that when the cam 46 is at the end of its movement into which it is urged by the spring 23 and at which it is stopped by the stop means, the dwell portion 47 of the cam opposes the stud 45, with the result that the contacts 36 and 37 of the switch 33 are in contact and the motor 58 is energized, adjustment of the stop means of Figures 7 to 10 inclusive, to vary the position at which the cam 46, as urged by the spring 23, is stopped by the stop means, results in a greater or less extent of the dwell portion 47 of the cam traversing the stud 45 during the overrun condition when the motor 58 is rotating the cam to the opposite end of its movement where the lift portion 48 of the cam depresses the stud 45 to deenergize the motor and terminate the overrun condition, as shown in Figures 9 and 10 which illustrate the same condition as is illustrated in Figure 2 hereinabove described. Consequently, the adjustable stop means of Figures 7 to 10 inclusive provides for variation of the overrun interval at will by adjustment of the stop lever 109.

While we have thus described our invention, we do not wish to be limited to the precise details described, as changes may be readily made without departing from the spirit of our invention, but having thus described our invention, we claim as new and desire to secure by Letters Patent the following:

1. In a device of the character described, the combination of an electric motor, an electric switch controlling the energization of said motor, a movable switch controlling member yieldably urged in one direction, stop means operative to limit movement of said switch controlling member in its yieldably urged direction, said switch controlling member being operative to position said switch in motor energizing position throughout a substantial portion of its movement including the end of its movement into which it is yieldably urged and to position said switch in motor deenergizing position when it is at the opposite end of its movement, a drive connection comprising a disengageable clutch between said motor and switch controlling member and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch when disengaged permitting actuation of said switch controlling member under its yieldable urge to said first mentioned end of its movement with consequent positioning of said switch in motor energizing position, and manually controlled means for disengaging said clutch for chosen intervals and reengaging the same.

2. In a device of the character described, the combination of an electric motor, an electric switch controlling the energization of said motor, a movable switch controlling member yieldably urged in one direction, stop means operative to limit movement of said switch controlling member in its yieldably urged direction, said switch controlling member being operative to position said switch in motor energizing position throughout a substantial portion of its movement including the end of its movement into which it is yieldably urged and to position said switch in motor deenergizing position when it is at the opposite end of its movement, a drive connection comprising a disengageable clutch between said motor and switch controlling member and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch being yieldably urged into engagement and when disengaged permitting actuation of said switch controlling member under its yieldable urge to said first mentioned end of its movement with consequent positioning of said switch in motor energizing position, an electromagnetic device operative when energized to disengage said clutch, and a manually controlled second electric switch for energizing said electromagnetic device for chosen intervals and deenergizing the same.

3. In a device of the character described, the combination of an electric motor, an electric switch controlling the energization of said motor, an angularly movable switch controlling member, stop means operative to limit movement of said switch controlling member in one direction, said switch controlling member being operative to position said switch in motor energizing position throughout a substantial portion of its movement including the end of its movement at which it is stopped by said stop means and to position said switch in motor deenergizing position when it is at the opposite end of its movement, a drive connection comprising a disengageable clutch between said motor and switch controlling member and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch when disengaged permitting actuation of said switch controlling member to said first mentioned end of its movement with consequent positioning of said switch in motor energizing position and said clutch comprising axially engageable clutch members disposed coaxially of said switch controlling member and one of which is axially shiftable to engage and disengage said clutch members, a helical spring disposed coaxially of said switch controlling member and torsionally operative on said switch controlling member to actuate the same to said first mentioned end of its movement when said clutch is disengaged and compressionally operative on said axially shiftable clutch member to engage said clutch members, and manually controlled means for disengaging said clutch for chosen intervals and reengaging the same.

4. In a device of the character described, the combination of an electric motor, an electric switch controlling the energization of said motor, a rotatable and axially shiftable shaft, an angularly movable switch controlling member disposed coaxially of said shaft, a driving connection operative to angularly fix said switch controlling member and shaft, stop means operative to limit movement of said switch controlling member in one direction, said switch controlling member being operative to position said switch in motor energizing position throughout a substantial portion of its movement including the end of its movement at which it is stopped by said stop means and to position said switch in motor deenergizing position when it is at the opposite end of its movement, a drive connection comprising a disengageable clutch between said motor and said shaft and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch when disengaged permitting actuating of said switch controlling member to said first mentioned end of its movement with consequent positioning of said switch in motor energizing position and said clutch comprising axially engageable clutch members disposed coaxially of said shaft and one of which is fixed on said shaft for axial shifting movement therewith to engage and disengage said clutch members, spring means operative to actuate said switch controlling member to said first mentioned end of its movement when said clutch is disengaged and operative to axially actuate said one clutch member and shaft to engage said clutch, an electromagnetic device operative when energized to disengage said clutch, and a manually controlled second electric switch for energizing said electromagnetic device for chosen intervals and deenergizing the same.

5. In a device of the character described, the combination of an electric motor, an electric switch controlling the energization of said motor, a rotatable and axially shiftable shaft, an angularly movable switch controlling member disposed coaxially of said shaft in the region of one end thereof, a driving connection operative to angularly fix said switch controlling member and shaft, stop means operative to limit movement of said switch controlling member in one direction, said switch controlling member being operative to position said switch in motor energizing position throughout a substantial portion of its movement including the end of its movement at which it is stopped by said stop means and to position said switch in motor deenergizing position when it is at the opposite end of its movement, a drive connection comprising a disengageable clutch between said motor and said shaft and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch when disengaged permitting actuation of said switch controlling member to said first mentioned end of its movement with consequent positioning of said switch in motor energizing position and said clutch comprising axially engageable clutch members disposed coaxially of said shaft in the region of the other end thereof and one of which is fixed on said shaft for axial shifting movement therewith to engage and disengage said clutch members, spring means operative to actuate said switch controlling member to said first mentioned end of its movement when said clutch is disengaged and operative to actuate said one clutch member and said shaft to engage said clutch members, an electromagnetic device operative when energized to disengage said clutch and comprising a solenoid surrounding the intermediate portion of said shaft and a portion of said shaft being of magnetic material and forming an armature for said solenoid, and a manually controlled second electric switch for energizing said solenoid for chosen intervals and deenergizing the same.

6. In a device of the character described, the combination of an electric motor, an electric switch controlling the energization of said motor, a rotatable and axially shiftable shaft, an angularly movable axially bored switch controlling member disposed coaxially of said shaft in the region of one end thereof and into the bore of which said shaft projects, a driving connection operative to angularly fix said switch controlling member and shaft and to permit axial movement of said shaft relative to said switch controlling member, stop means operative to limit movement of said switch controlling member in one direction, said switch controlling member being operative to position said switch in motor energizing position throughout a substantial portion of its movement including the end of its movement at which it is stopped by said stop means and to position said switch in motor deenergizing position when it is at the opposite end of its movement, a drive connection comprising a disengageable clutch between said motor and said shaft and operative when said clutch is engaged and said motor is energized under the control of said switch to cause said motor to actuate said switch controlling member to said opposite end of its movement with consequent positioning of said switch in motor deenergizing position and to maintain while said clutch is engaged said switch controlling member at said opposite end of its movement, said clutch when disengaged permitting actuation of said switch controlling member to said first mentioned end of its movement with consequent positioning of said switch in motor energizing position and said clutch comprising axially engageable clutch members disposed coaxially of said shaft in the region of the other end thereof and one of which is fixed on said shaft for axial shifting movement therewith to engage and disengage said clutch members, a helical spring disposed within the bore of said switch controlling member and surrounding said shaft and torsionally operative on said switch controlling member to actuate the same to said first mentioned end of its movement when said clutch is disengaged and compressionally operative on said shaft to engage said clutch members, an electromagnetic device operative when energized to disengage said clutch and comprising a solenoid surrounding the intermediate portion of said shaft and a portion of said shaft being of magnetic material and forming an armature for said solenoid, and a manually controlled second electric switch for energizing said solenoid for chosen intervals and deenergizing the same.

7. In a device of the character described, the combination of an electric motor, a snap action electric switch controlling the energization of said motor and yieldably urged into one of its circuit controlling positions, an angularly movable cam yieldably urged in one direction, stop means operative to limit movement of said cam in its yieldably urged direction, said cam being operative to position said switch in motor energizing position throughout a substantial portion of its movement including the end of its movement into which it is yieldably urged and to position said switch in motor deenergizing position when it is at the opposite end of its movement, a drive connection comprising a disengageable clutch between said motor and said cam and operative when said clutch is engaged and said motor is energized under the control of said switch to cause said motor to actuate said cam to said opposite end of its movement with consequent positioning of said switch in motor deenergizing position and to maintain while said clutch is engaged said cam at said opposite end of its movement, said clutch when disengaged permitting actuation of said cam under its yieldable urge to said first mentioned end of its movement with consequent positioning of said switch in motor energizing position, and manually controlled means for disengaging said clutch for chosen intervals and reengaging the same.

8. In a device of the character described, the combination of an electric motor, a snap action electric switch controlling the energization of said motor and yieldably urged into one of its circuit controlling positions, an angularly movable cam yieldably urged in one direction, stop means operative to limit movement of said cam in its yieldably urged direction, said cam being operative to position said switch in motor energizing position throughout a substantial portion of its movement including the end of its movement into which it is yieldably urged and to position said switch in motor deenergizing position when it is at the opposite end of its movement, a driving connection comprising a disengageable toothed clutch between said motor and said cam and operative when said clutch is engaged and said motor is energized under the control of said switch to cause said motor to actuate said cam to said opposite end of its movement with consequent positioning of said switch in motor deenergizing position and to maintain while said clutch is engaged said cam at said opposite end of its movement, said clutch being yieldably urged into engagement and when disengaged permitting actuation of said cam under its yieldable urge to said first mentioned end of its movement with consequent positioning of said switch in motor energizing position, an electromagnetic device operative when energized to disengage said clutch, and a manually controlled second electric switch for energizing said electromagnetic device for chosen intervals and deenergizing the same.

9. In a device of the character described, the combination of an electric motor, a snap action electric switch controlling the energization of said motor and yieldably urged into one of its circuit controlling positions, a rotatable and axially shiftable shaft, an angularly movable cam disposed coaxially of said shaft, a driving connection operative to angularly fix said cam and shaft, stop means operative to limit movement of said cam in one direction, said cam being operative to position said switch in motor energizing position throughout a substantial portion of its movement including the end of its movement at which it is stopped by said stop means and to position said switch in motor deenergizing position when it is at the opposite end of its movement, a drive connection comprising a disengageable clutch between said motor and said shaft and operative when said clutch is engaged and said motor is energized under the control of said switch to cause said motor to actuate said cam to said opposite end of its movement with consequent positioning of said switch in motor deenergizing position and to maintain while said clutch is engaged said cam at said opposite end of its movement, said clutch when disengaged permitting actuation of said cam to said first mentioned end of its movement with consequent positioning of said switch in motor energizing position and said clutch comprising axially engageable clutch members disposed coaxially of said shaft and one of which is fixed on said shaft for axial shifting movement therewith to engage and disengage said clutch members, spring means operative to actuate said cam to said first mentioned end of its movement when said clutch is disengaged and operative to actuate said one clutch member and shaft to engage said clutch, an electromagnetic device operative when energized to disengage said clutch, and a manually controlled second electric switch for energizing said electromagnetic device for chosen intervals and deenergizing the same.

10. In a device of the character described, the combination of an electric motor, a snap action electric switch controlling the energization of said motor and yieldably urged into one of its circuit controlling positions, a rotatable axially shiftable shaft, an angularly movable axially bored cam disposed coaxially of said shaft in the region of one end thereof and into the bore of which said shaft projects, a driving connection operative to angularly fix said cam and shaft and to permit axial movement of said shaft relative to said cam, stop means operative to limit movement of said cam in one direction, said cam being operative to position said switch in motor energizing position throughout a substantial portion of its movement including the end of its movement at which it is stopped by said stop means and to position said switch in motor deenergizing position when it is at the opposite end of its movement, a drive connection comprising a disengageable toothed clutch between said motor and said shaft and operative when said clutch is engaged and said motor is energized under the control of said switch to cause said motor to actuate said cam to said opposite end of its movement with consequent positioning of said switch in motor deenergizing position and to maintain while said clutch is engaged said cam at said opposite end of its movement, said clutch when disengaged permitting actuation of said cam to said first mentioned end of its movement with consequent positioning of said switch in motor energizing position and said clutch comprising axially engageable toothed clutch members disposed coaxially of said shaft and one of which is fixed on said shaft for axial shifting movement therewith to engage and disengage said clutch members, a helical spring disposed within the bore of said cam and surrounding said shaft and torsionally operative on said cam to actuate the same to said first mentioned end of its movement when said clutch is disengaged and compressionally operative on said shaft to engage said clutch members, an electromagnetic device operative when energized to disengage said clutch and comprising a solenoid surrounding the intermediate portion of said shaft and a portion of said shaft being of magnetic material and forming an armature for said solenoid, and a manually controlled second electric switch for energizing said solenoid for chosen intervals and deenergizing the same.

11. In a device of the character described, the combination as set forth in claim 1 and further characterized in that said stop means comprises a plurality of said stop elements stepped lineally and transversely of the movement of said switch controlling member and a cooperating stop element adjustable transversely of said movement to be selectively engaged by said stepped stop elements for varying the position of said switch controlling member when stopped by said stop means.

12. In a device of the character described, the combination as set forth in claim 7 and further characterized in that said stop means comprises a plurality of stop elements on and stepped angularly and axially of said cam and a cooperating stop element adjustable axially of said cam to be selectively engaged by said stepped stop elements for varying the position of said cam when stopped by said stop means.

MALCOLM G. TOWNSLEY.
WILLIAM MACK.

REFERENCES CITED

The following references are of record in the file of this patent:

UNITED STATES PATENTS

| Number | Name | Date |
|---|---|---|
| 1,863,646 | Baumann et al. | June 21, 1932 |
| 2,248,350 | Hill | July 8, 1941 |
| 2,285,415 | Collins | June 9, 1942 |
| 2,290,626 | Bosomworth | July 21, 1942 |